US011947307B2

(12) United States Patent
Mori et al.

(10) Patent No.: US 11,947,307 B2
(45) Date of Patent: *Apr. 2, 2024

(54) DRUM CARTRIDGE HAVING ELECTRICAL CONTACT SURFACE POSITIONED AT OUTER SURFACE OF DRUM FRAME

(71) Applicant: BROTHER KOGYO KABUSHIKI KAISHA, Nagoya (JP)

(72) Inventors: Hiroki Mori, Nagoya (JP); Atsushi Fukaya, Toyohashi (JP); Tsubasa Kiriyama, Nagoya (JP); Nao Itabashi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/878,975

(22) Filed: Aug. 2, 2022

(65) Prior Publication Data

US 2022/0365478 A1 Nov. 17, 2022

Related U.S. Application Data

(63) Continuation of application No. 17/347,860, filed on Jun. 15, 2021, now Pat. No. 11,442,398, which is a (Continued)

(30) Foreign Application Priority Data

Aug. 30, 2019 (JP) ................................. 2019-158771

(51) Int. Cl.
*G03G 15/00* (2006.01)
*G03G 21/16* (2006.01)

(52) U.S. Cl.
CPC ..... *G03G 21/1652* (2013.01); *G03G 21/1671* (2013.01)

(58) Field of Classification Search
CPC ........... G03G 21/1652; G03G 21/1671; G03G 21/1857
(Continued)

(56) References Cited

U.S. PATENT DOCUMENTS 5,963,759 A 10/1999 Kojima et al.
7,899,364 B2 3/2011 Chandani et al.
(Continued)

FOREIGN PATENT DOCUMENTS

JP 10-49032 A 2/1998
JP 2004-45857 A 2/2004
(Continued)

OTHER PUBLICATIONS

Office Action issued in corresponding Japanese Patent Application No. 2019-158771, dated May 23, 2023.

*Primary Examiner* — Hoan H Tran
(74) *Attorney, Agent, or Firm* — Merchant & Gould P.C.

(57) ABSTRACT

A drum cartridge includes: a photosensitive drum; a drum frame; a drum coupling; and an electrical contact surface. The photosensitive drum is rotatable about an axis extending in a first direction. The drum frame has one end portion in a second direction at which the photosensitive drum is positioned. The drum coupling is rotatable together with the photosensitive drum. The drum coupling is positioned at an outer surface of one side in the first direction of the drum frame. The electrical contact surface is positioned closer to another side in the second direction of the drum frame than the drum coupling is to the another side in the second direction of the drum frame.

17 Claims, 9 Drawing Sheets

Related U.S. Application Data continuation of application No. 17/002,994, filed on Aug. 26, 2020, now Pat. No. 11,054,787.

(58) Field of Classification Search
USPC .................................. 399/107, 110, 111, 117
See application file for complete search history.

(56) References Cited

U.S. PATENT DOCUMENTS

| | | | | |
|---|---|---|---|---|
| 8,116,660 | B2 | 2/2012 | Watanabe | |
| 9,261,855 | B2 | 2/2016 | Fujinaka et al. | |
| 9,927,767 | B2 * | 3/2018 | Itabashi ............ | G03G 21/1857 |
| 11,442,398 | B2 * | 9/2022 | Mori .................. | G03G 21/1671 |
| 2003/0215257 | A1 | 11/2003 | Karakama et al. | |
| 2007/0264040 | A1 | 11/2007 | Miller | |
| 2011/0129252 | A1 | 6/2011 | Oda et al. | |
| 2018/0314202 | A1 | 11/2018 | Yokoi | |
| 2019/0391529 | A1 | 12/2019 | Abe et al. | |
| 2020/0096938 | A1 | 3/2020 | Endo | |

FOREIGN PATENT DOCUMENTS

| | | | |
|---|---|---|---|
| JP | 2011-118119 | A | 6/2011 |
| JP | 2018-146829 | A | 9/2018 |
| JP | 2018-146830 | A | 9/2018 |
| JP | 2018-189740 | A | 11/2018 |
| JP | 2018173480 | * | 11/2018 |
| JP | 2018-205537 | A | 12/2018 |

* cited by examiner

DRUM CARTRIDGE HAVING ELECTRICAL CONTACT SURFACE POSITIONED AT OUTER SURFACE OF DRUM FRAME

CROSS REFERENCE TO RELATED APPLICATION

This application is a continuation of U.S. patent application Ser. No. 17/347,860, filed Jun. 15, 2021, now U.S. Pat. No. 11,442,398, which is a continuation of U.S. patent application Ser. No. 17/002,994, filed Aug. 26, 2020, now U.S. Pat. No. 11,054,787, which claims priority from Japanese Patent Application No. 2019-158771 filed Aug. 30, 2019. The entire content of the priority applications is incorporated herein by reference.

TECHNICAL FIELD

The present disclosure relates to a drum cartridge and an image forming apparatus.

BACKGROUND

There has been conventionally known an electro-photographic type image forming apparatus such as a laser printer and an LED printer. Prior art discloses a conventional image forming apparatus that includes a developing cartridge and a drum cartridge. The developing cartridge is attachable to the drum cartridge. The drum cartridge to which the developing cartridge is attached is attached to a main body frame of the image forming apparatus. The developing cartridge described in the prior art includes an IC chip. The IC chip stores therein various information on the developing cartridge.

SUMMARY

In recent years, mounting of an IC chip not only on the developing cartridge but also on the drum cartridge has been demanded. However, an electrical contact surface of the IC chip needs to contact an electrical contact of the image forming apparatus, if the IC chip is mounted on the drum cartridge. Hence, accurate positioning of the electrical contact surface with respect the main body frame of the image forming apparatus is required when the drum cartridge is attached to the main body frame of the image forming apparatus.

In view of the foregoing, it is an object of the disclosure to provide a technology capable of accurately positioning an electrical contact surface provided on a drum cartridge with respect a main body frame of an image forming apparatus.

In order to attain the above and other objects, according to one aspect, the disclosure provides a drum cartridge including: a photosensitive drum; a drum frame; a drum coupling; and an electrical contact surface. The photosensitive drum is rotatable about an axis extending in a first direction. The drum frame has one end portion in a second direction at which the photosensitive drum is positioned. The drum coupling is rotatable together with the photosensitive drum. The drum coupling is positioned at an outer surface of one side in the first direction of the drum frame. The electrical contact surface is positioned closer to another side in the second direction of the drum frame than the drum coupling is to the another side in the second direction of the drum frame.

According to another aspect, the disclosure provides an image forming apparatus to which the above drum cartridge is attachable. The image forming apparatus includes: a main body frame to which the drum cartridge is attachable; and an electrical contact in contact with the electrical contact surface in a state where the drum cartridge is attached to the main body frame.

According to still another aspect, the disclosure provides an image forming apparatus including: a drum cartridge; a main body frame to which the drum cartridge is attachable; an electrical contact; and a belt unit. The drum cartridge includes: a photosensitive drum; a drum frame; an electrical contact surface; and a holder. The photosensitive drum is rotatable about an axis extending in a first direction. The drum frame has one end portion in a second direction at which the photosensitive drum is positioned. The holder is positioned at an outer surface of the drum frame and movable in the second direction relative to the drum frame. The holder holds the electrical contact surface. The electrical contact is in contact with the electrical contact surface in a state where the drum cartridge is attached to the main body frame. The belt unit is configured to press the drum frame toward another side in the second direction in the state where the drum cartridge is attached to the main body frame.

BRIEF DESCRIPTION OF THE DRAWINGS

The particular features and advantages of the embodiment (s) as well as other objects will become apparent from the following description taken in connection with the accompanying drawings, in which.

DETAILED DESCRIPTION

Hereinafter, one embodiment of the present disclosure will be described with reference to the accompanying drawings.

In the following description, a direction in which a rotation axis of a photosensitive drum extends will be referred to as "first direction". Further, a direction in which a drum coupling and an electrical contact surface in a drum cartridge are arranged will be referred to as "second direction". Still further, a direction in which four of the drum cartridges are arranged will be referred to as "third direction". The first direction and the second direction cross each other, preferably, are perpendicular to each other. The second direction and the third direction cross each other. The third direction and the first direction cross each other, preferably, are perpendicular to each other.

<1. Configuration of Image Forming Apparatus>

Figure 1:
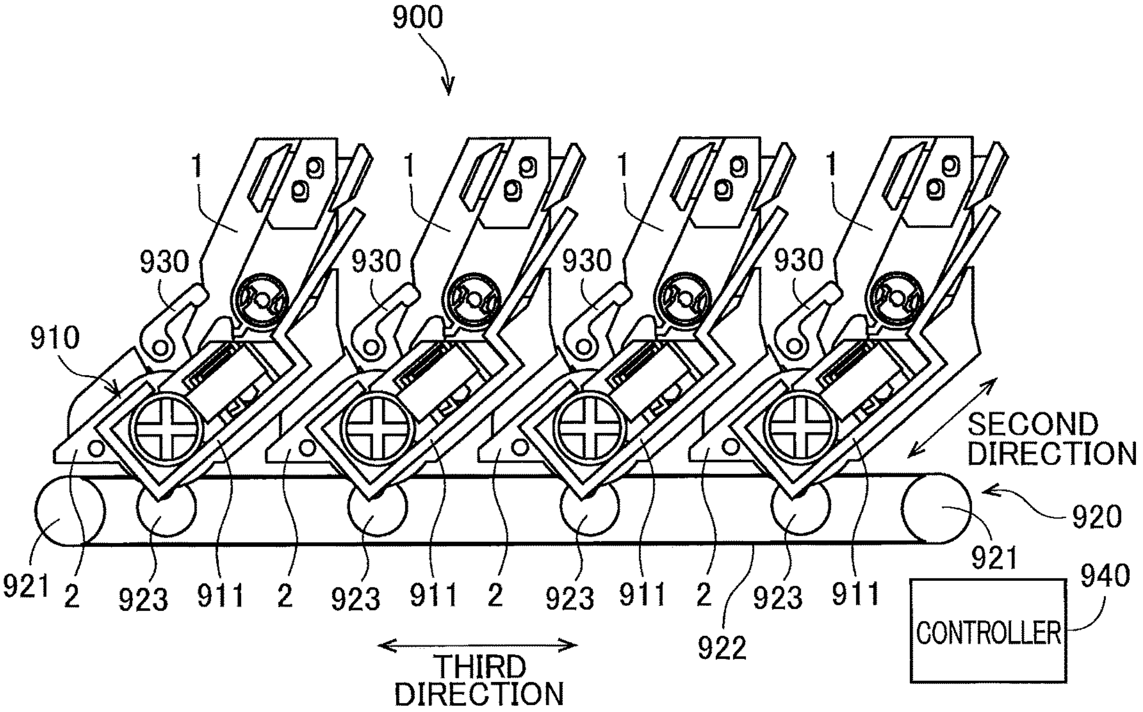
FIG. 1 is a partial side view of an image forming apparatus according to one embodiment of the present disclosure.
Figure 2:
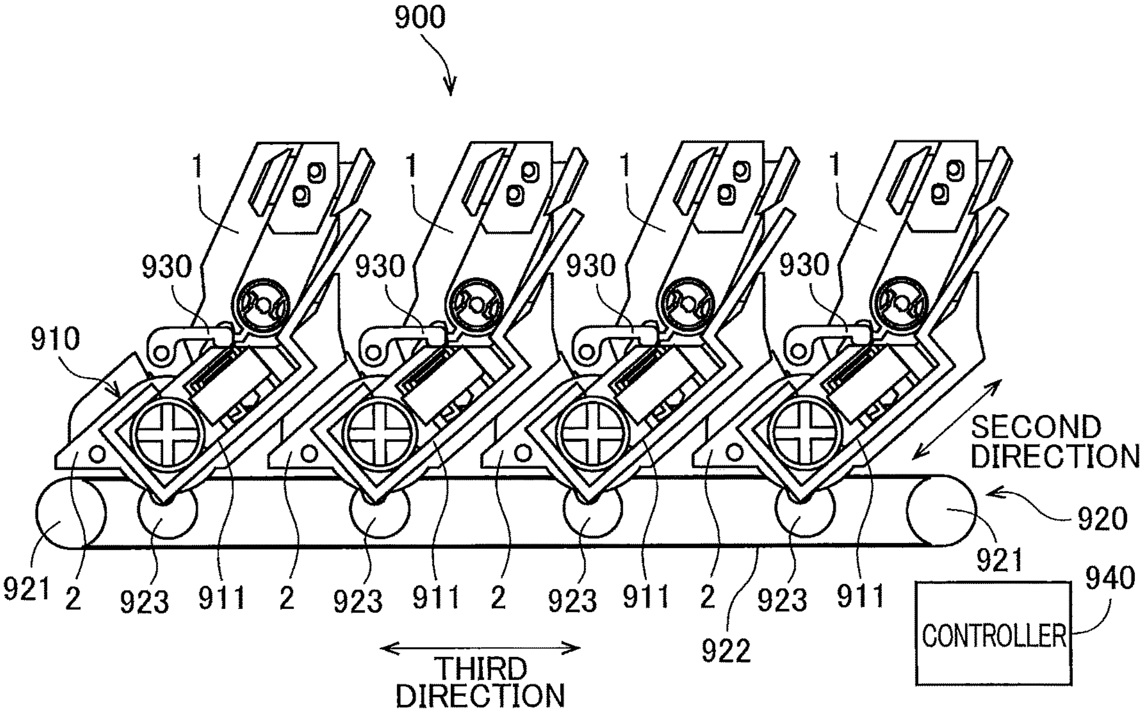
FIG. 2 is another partial side view of the image forming apparatus according to the embodiment.

FIGS. 1 and 2 are partial side views of an image forming apparatus 900 according to the embodiment. The image forming apparatus 900 is an electro-photographic type printer such as a laser printer and an LED printer. The image forming apparatus 900 includes a main body frame 910, a belt unit 920, four lock levers 930, a controller 940, four toner cartridges 1, and four drum cartridges 2.

The main body frame 910 includes four guide frames 911. The four guide frames 911 are arranged to be spaced apart from one another in the third direction. A single toner cartridge 1 is configured to be attached to a single (corresponding) drum cartridge 2. The single drum cartridge 2 to which the single toner cartridge 1 is attached is configured to be attached to a single (corresponding) guide frame 911. Hence, four drum cartridges 2 to which the corresponding toner cartridges 1 are attached are attachable to the main body frame 910.

Four toner cartridges 1 accommodate therein developing agents of colors different from each other (for example, cyan, magenta, yellow, and black). The image forming apparatus 900 is configured to form an image on a printing surface of a printing paper using developing agents (for example, toners) supplied from the toner cartridges 1. Note that the number of the drum cartridges 2 attachable to the main body frame 910 may be one to three, or not less than five.

The belt unit 920 includes two pulleys 921, a transfer belt 922 having an annular shape and looped over the two pulleys 921, and four pressure rollers 923. The transfer belt 922 is nipped between the pressure rollers 923 and photosensitive drums 60 (described later) of the drum cartridges 2 in a state where the drum cartridges 2 are attached to the main body frame 910. With this configuration, outer circumferential surfaces of the photosensitive drums 60 and an outer peripheral surface of the transfer belt 922 are in intimate contact with each other.

One of the two pulleys 921 rotates upon receiving a driving force from a motor (not illustrated), thereby circularly moving the transfer belt 922. The printing paper is conveyed to a portion between the photosensitive drum 60 and the transfer belt 922. Thus, developing agent (toner) is transferred from the outer circumferential surface of the photosensitive drum 60 to the printing paper.

Each of the lock levers 930 is configured to fix in position one of the drum cartridges 2 relative to the corresponding one of the guide frames 911. Each of the lock lever 930 is pivotally movable about a pivot axis extending in the first direction. Specifically, when a main body cover (not illustrated) of the image forming apparatus 900 is closed after the drum cartridges 2 to which the toner cartridges 1 are attached are attached to the guide frames 911, each of the lock levers 930 pivotally moves from a release position (a position illustrated in FIG. 1) where the lock lever 930 is spaced apart from the corresponding drum cartridge 2 to a locking position (a position illustrated in FIG. 2) where the lock lever 930 is in contact with the corresponding drum cartridge 2. Therefore, each lock lever 930 presses the corresponding drum cartridge 2 toward the belt unit 920.

The controller 940 is constituted by, for example, a circuit board. The controller 940 includes a processor such as a CPU, and various memories. The controller 940 is configured to execute various processing in the image forming apparatus 900 by operating of the processor in accordance with programs.

<2. Toner Cartridge>

Figure 3:
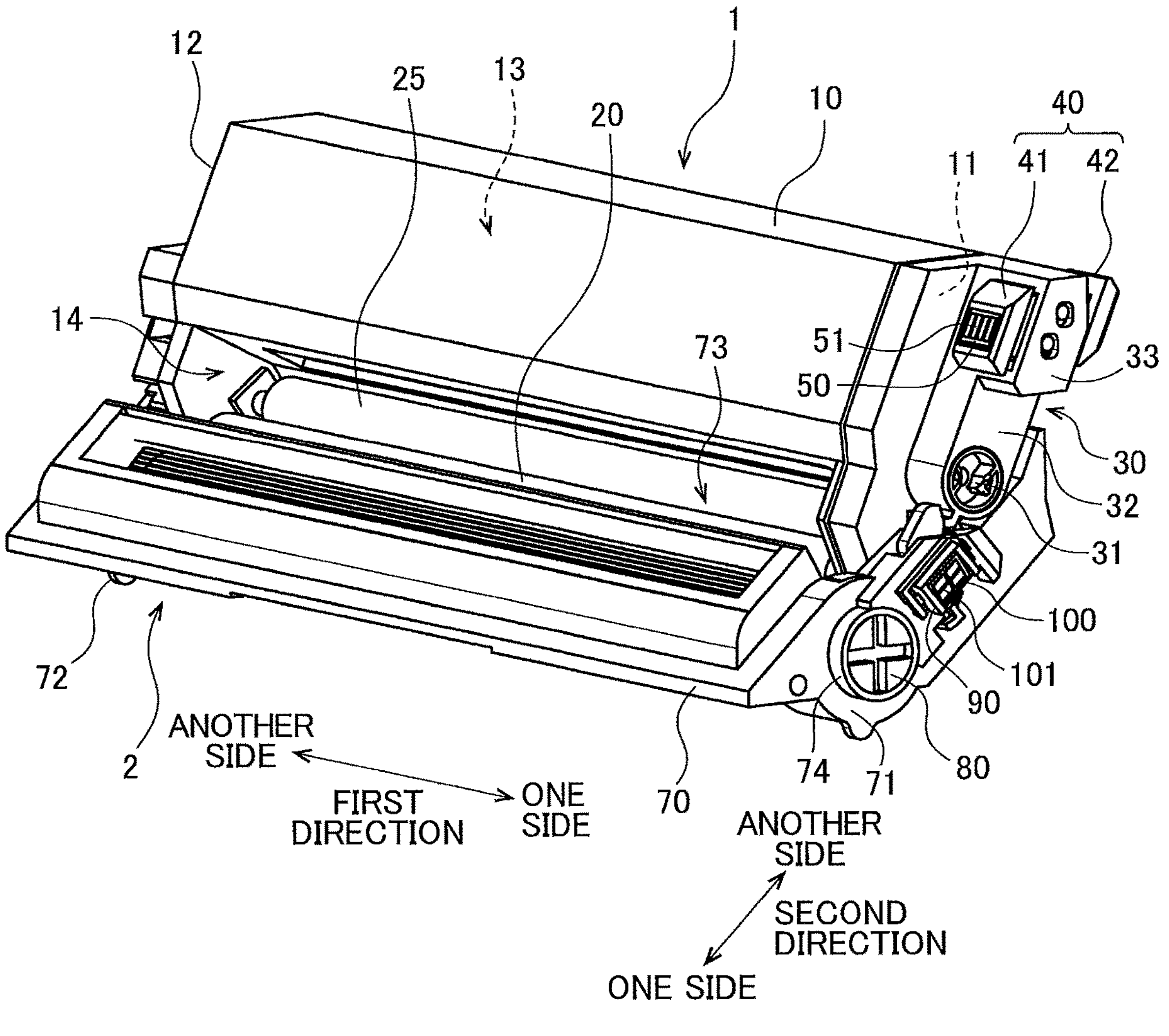
FIG. 3 is a perspective view of a drum cartridge according to the embodiment to which a toner cartridge is attached.
Figure 4:
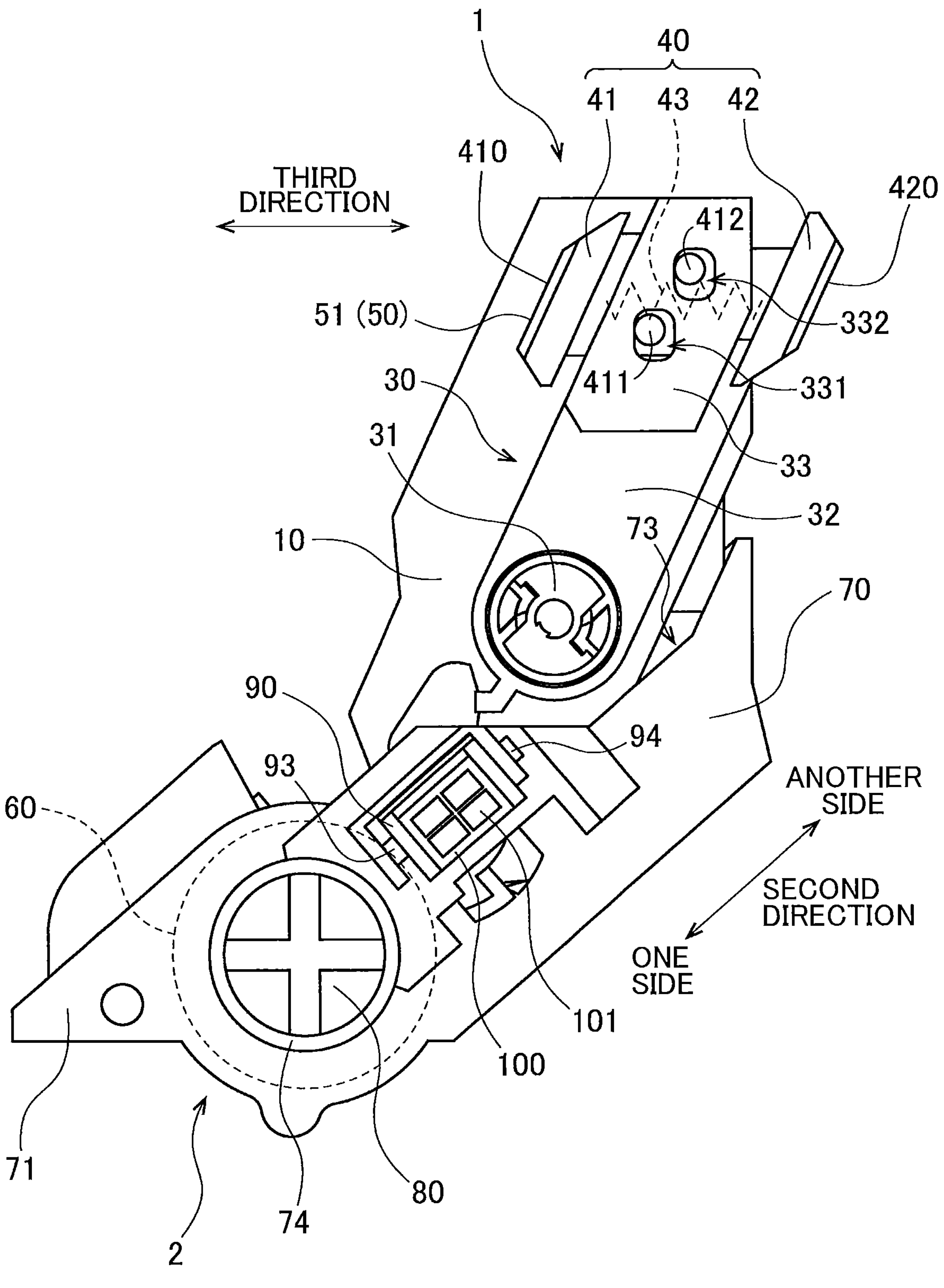
FIG. 4 is a view of the drum cartridge according to the embodiment to which the toner cartridge is attached as viewed from one side in a first direction.

FIG. 3 is a perspective view of the drum cartridge 2 to which the toner cartridge 1 is attached. FIG. 4 is a view of the drum cartridge 2 to which the toner cartridge 1 is attached as viewed from one side in the first direction. As illustrated in FIGS. 3 and 4, the toner cartridge 1 includes a casing 10, a developing roller 20, a gear portion 30, a toner holder 40, and a toner memory 50.

The casing 10 is a container configured to accommodate developing agent (toner) therein. The casing 10 has a first outer surface 11 and a second outer surface 12. The first outer surface 11 and the second outer surface 12 are spaced apart from each other in the first direction. That is, the casing 10 extends in the first direction between the first outer surface 11 and the second outer surface 12. The gear portion 30, the toner holder 40, and the toner memory 50 are positioned at the first outer surface 11.

The casing 10 has an internal space in which an accommodation chamber 13 is provided. The developing agent is accommodated within the accommodation chamber 13. The casing 10 has an opening 14. The opening 14 is positioned at one end in the second direction of the casing 10. The accommodation chamber 13 is in communication with an outside of the casing 10 through the opening 14.

The developing roller 20 is rotatable about a rotation axis extending in the first direction. The developing roller 20 is positioned at the opening 14 of the casing 10. That is, the developing roller 20 is positioned at the one end in the second direction of the casing 10. The developing roller 20 includes a roller body and a roller shaft. The roller body is a hollow cylindrical member extending in the first direction. The roller body is made from an elastic material such as a rubber, for example. The roller shaft is a solid cylindrical member that penetrates the roller body in the first direction. The roller shaft is made from metal or electrically conductive resin.

The roller body is fixed to the roller shaft. Further, the roller shaft has one end in the first direction fixed to a developing roller gear of the gear portion 30. Accordingly, rotation of the developing roller gear causes rotation of the roller shaft to rotate the roller body.

Incidentally, the roller shaft may not penetrate the roller body in the first direction. For example, a roller shaft may extend in the first direction from each end in the first direction of the roller body.

The toner cartridge 1 further includes a supply roller 25. The supply roller 25 is positioned between the developing roller 20 and the accommodation chamber 13. The supply roller 25 is rotatable about a rotation axis extending in the first direction. When the toner cartridge 1 receives a driving force, developing agent is supplied from the accommodation chamber 13 in the casing 10 to an outer circumferential surface of the developing roller 20 through the supply roller 25. At this time, developing agent is triboelectric charged between the supply roller 25 and the developing roller 20. In the meantime, bias voltage is applied to the roller shaft of the developing roller 20. Hence, developing agent is attracted to the outer circumferential surface of the developing roller 20 by electrostatic force generated between the roller shaft and the developing agent.

The toner cartridge 1 further includes a layer thickness regulation blade (illustration is omitted). The layer thickness regulation blade is configured to regulate a thickness of a layer of the developing agent supplied onto the outer circumferential surface of the developing roller 20 so that the thickness of the layer of the developing agent is formed to a constant thickness. Then, the developing agent on the outer circumferential surface of the developing roller 20 is supplied to the photosensitive drum 60 (described later) of the drum cartridge 2. At this time, the developing agent moves from the developing roller 20 to the photosensitive drum 60 in accordance with an electrostatic latent image formed on the outer circumferential surface of the photosensitive drum 60. Hence, the electrostatic latent image becomes a visible image on the outer circumferential surface of the photosensitive drum 60.

As described above, the gear portion 30 is positioned at the first outer surface 11 of the casing 10. The gear portion 30 includes a plurality of gears including the developing roller gear, a toner coupling 31, and a gear cover 32. The gear cover 32 is fixed to the first outer surface 11 of the casing 10 by means of, for example, a screw. At least a portion of the plurality of gears is positioned between the first outer surface 11 and the gear cover 32.

The toner coupling 31 is exposed to an outside through an opening formed in the gear cover 32. When the drum cartridge 2 to which the toner cartridge 1 is attached is attached to the main body frame 910 of the image forming apparatus 900, a toner drive shaft (not illustrated) of the image forming apparatus 900 is coupled to the toner coupling 31. Rotation of the toner drive shaft is transmitted to the plurality of gears including the developing roller gear through the toner coupling 31.

Incidentally, the plurality of gears of the gear portion 30 may be configured to transmit a rotational force by meshing engagement between gear teeth of the gears, or may be configured to transmit the rotational force through a frictional force generated between the gears.

The toner holder 40 is positioned at one end in the first direction of the casing 10. As illustrated in FIGS. 3 and 4, the toner holder 40 includes a first holder member 41, a second holder member 42, and a coil spring 43. The first holder member 41 has a first holder outer surface 410. The second holder member 42 has a second holder outer surface 420. The first holder outer surface 410 and the second holder outer surface 420 are spaced apart from each other in the third direction.

The coil spring 43 is a resilient member capable of expanding and contracting in the third direction. The coil spring 43 is positioned between the first holder outer surface 410 and the second holder outer surface 420 in the third direction. The coil spring 43 has one end portion in the third direction connected to the first holder member 41, and has another end portion in the third direction connected to the second holder member 42. Since the coil spring 43 can expand and contract in the third direction, the first holder outer surface 410 is movable in the third direction relative to the second holder outer surface 420.

As illustrated in FIGS. 3 and 4, the gear cover 32 includes a holder cover 33. At least a portion of the toner holder 40 is covered with the holder cover 33. The first holder member 41 includes a first boss 411 and a second boss 412. The first boss 411 and the second boss 412 protrude in the first direction toward the holder cover 33 from a surface of the first holder member 41 facing the holder cover 33. On the other hand, the holder cover 33 has a first through-hole 331 and a second through-hole 332. Both the first through-hole 331 and the second through-hole 332 penetrate the holder cover 33 in the first direction. The first boss 411 is inserted into the first through-hole 331, and the second boss 412 is inserted into the second through-hole 332.

The first through-hole 331 has a size (inner dimension) greater than a size (outer dimension) of the first boss 411 in both the second direction and the third direction. Further, the second through-hole 332 has a size (inner dimension) greater than a size (outer dimension) of the second boss 412 in both the second direction and the third direction. With this configuration, the toner holder 40 is movable in the second direction and the third direction together with the first boss 411 and the second boss 412 relative to the casing 10, the gear cover 32, and the holder cover 33.

The toner memory 50 is a storage medium that can store therein various information on the toner cartridge 1. The toner memory 50 is positioned at the first holder outer surface 410 of the toner holder 40. For example, the information stored in the toner memory 50 is at least one of: serial number of the toner cartridge 1; accumulated rotation amount of the developing roller 20; accumulated number of printed papers using the developing roller 20; accumulated number of dots using the developing roller 20; models compatible with the toner cartridge 1; specification of the toner cartridge 1; information indicating whether or not the toner cartridge 1 is new; information indicating whether or not the toner cartridge 1 is a genuine product; and an error history as to the toner cartridge 1.

In a case where the accumulated rotation amount, the accumulated number of printed papers, and/or the accumulated number of dots described above are stored in the toner memory 50, the controller 940 of the image forming apparatus 900 is configured to update these accumulated rotation amount, accumulated number of printed papers, and accumulated number of dots stored in the toner memory 50 each time printing process is performed. This update process may be performed by incrementing value from zero (0) or by decrementing value from a prescribed value.

An IC chip can be employed as the toner memory 50, for example. The toner memory 50 has an electrical contact surface 51 having electrical conductivity. As the toner holder 40 moves relative to the casing 10, the electrical contact surface 51 of the toner memory 50 also moves along with movement of the toner holder 40.

The image forming apparatus 900 further includes toner-electrical contacts (not illustrated) capable of contacting the electrical contact surfaces 51 of the toner memories 50 of the toner cartridges 1. Each toner-electrical contact is electrically connected to the controller 940. The electrical contact surface 51 of the toner memory 50 of each toner cartridge 1 is brought into contact with the corresponding toner-electrical contact when the drum cartridge 2 to which the toner cartridge 1 is attached is attached to the main body frame 910 of the image forming apparatus 900. As a result, the controller 940 and the toner memory 50 are electrically connected to each other. Accordingly, the controller 940 can perform at least one of reading data from the toner memory 50 and writing data into the toner memory 50.

<3. Drum Cartridge>

As illustrated in FIGS. 3 and 4, the drum cartridge 2 includes the photosensitive drum 60, a drum frame 70, a drum coupling 80, a drum holder 90 (an example of a holder), and a drum memory 100.

The photosensitive drum 60 is rotatable about a rotation axis extending in the first direction. The photosensitive drum 60 has the outer circumferential surface having a cylindrical shape and extending in the first direction. The outer circumferential surface of the photosensitive drum 60 is covered with a photosensitive material. When the toner cartridge 1 is attached to the drum cartridge 2, the outer circumferential surface of the developing roller 20 contacts the outer circumferential surface of the corresponding photosensitive drum 60.

The drum frame 70 includes a first side plate 71 and a second side plate 72. The second side plate 72 is positioned further in the first direction toward another side than the first side plate 71. The photosensitive drum 60 is positioned at one end portion in the second direction of the drum frame 70. Specifically, the photosensitive drum 60 is positioned between one end portion in the second direction of the first side plate 71 and one end portion in the second direction of the second side plate 72. The photosensitive drum 60 is supported so as to be rotatable relative to the first side plate 71 and the second side plate 72.

The drum frame 70 is configured to receive the toner cartridge 1. Specifically, the drum frame 70 has a recess 73 to which the toner cartridge 1 is attached. The recess 73 is positioned between the first side plate 71 and the second side plate 72, and positioned further in the second direction toward another side than the photosensitive drum 60.

The drum coupling 80 is rotatable together with the photosensitive drum 60. The drum coupling 80 is positioned at an outer surface of the one side in the first direction of the drum frame 70. Specifically, the one end portion in the second direction of the first side plate 71 has a circular hole in which the drum coupling 80 is positioned. As a result of attachment of the drum cartridge 2 to the main body frame 910 of the image forming apparatus 900, a drum drive shaft (not illustrated) of the image forming apparatus 900 is coupled to the drum coupling 80. Rotation of the drum drive shaft is transmitted to the photosensitive drum 60 through the drum coupling 80.

The first side plate 71 includes a drum collar 74. The drum collar 74 has a hollow cylindrical shape that extends toward the one side in the first direction from an edge of the circular hole. The drum coupling 80 has a portion positioned inside the drum collar 74.

The drum holder 90 holds the drum memory 100. The drum holder 90 is positioned at one side surface in the first direction of the first side plate 71. The drum holder 90 is positioned further in the second direction toward the other side than the drum coupling 80.

Figure 5:
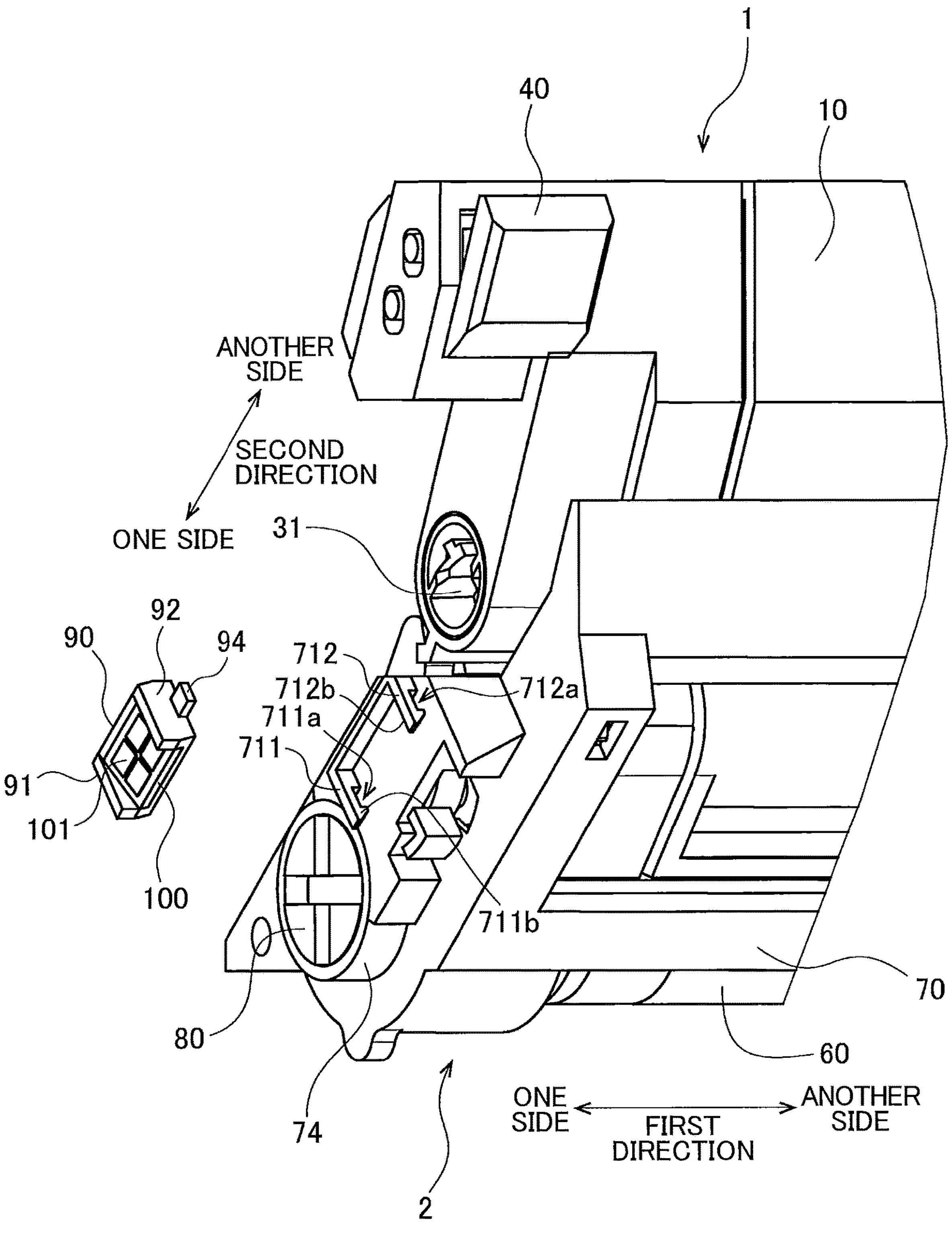
FIG. 5 is a partial exploded perspective view of the drum cartridge according to the embodiment, and particularly illustrating a state where a drum holder is detached from a drum frame of the drum cartridge.

FIG. 5 is an exploded perspective view of the drum cartridge 2 in which the drum holder 90 is detached from the drum frame 70. As illustrated in FIGS. 4 and 5, the drum holder 90 has a first end surface 91 and a second end surface 92, and includes a first protrusion 93 and a second protrusion 94. The first end surface 91 is one end surface in the second direction of the drum holder 90. The second end surface 92 is another end surface in the second direction of the drum holder 90. The first protrusion 93 protrudes toward one side in the second direction from the first end surface 91. The second protrusion 94 protrudes toward the other side in the second direction from the second end surface 92. The first end surface 91 is an example of one end surface, and the second end surface 92 is an example of another end surface.

The first side plate 71 includes a first rib 711 and a second rib 712. Each of the first rib 711 and the second rib 712 protrudes toward the one side in the first direction from the first side plate 71, and expands perpendicularly to the second direction. The first rib 711 is positioned further in the second direction toward the one side than the second rib 712.

The first rib 711 has a first guide hole 711*a* that penetrates the first rib 711 in the second direction. The second rib 712 has a second guide hole 712*a* that penetrates the second rib 712 in the second direction. The first protrusion 93 of the drum holder 90 is inserted into the first guide hole 711*a*. The second protrusion 94 of the drum holder 90 is inserted into the second guide hole 712*a*.

The first rib 711 further has a first restricting surface 711*b* facing the first end surface 91 of the drum holder 90 in the second direction. The second rib 712 further has a second restricting surface 712*b* facing the second end surface 92 of the drum holder 90 in the second direction. The first restricting surface 711*b* and the second restricting surface 712*b* provides a distance in the second direction greater than a length between the first end surface 91 and the second end surface 92 of the drum holder 90 in the second direction.

Accordingly, the drum holder 90 is movable in the second direction relative to the drum frame 70 between a first state where the first end surface 91 is in contact with the first restricting surface 711*b* and a second state where the second end surface 92 is in contact with the second restricting surface 712*b*.

The drum memory 100 is a storage medium that can store therein various information on the drum cartridge 2. The drum memory 100 is positioned at one side surface in the first direction of the drum holder 90. For example, the information stored in the drum cartridge 2 includes at least one of: serial number of the drum cartridge 2; accumulated rotation amount of the photosensitive drum 60; accumulated number of papers printed using the photosensitive drum 60; models compatible with the drum cartridge 2; specification of the drum cartridge 2; information indicating whether or not the drum cartridge 2 is new; information indicating whether or not the drum cartridge 2 is a genuine product; and an error history as to the drum cartridge 2.

In a case where the accumulated rotation amount and/or the accumulated number of printed papers described above are stored in the drum memory 100, the controller 940 of the image forming apparatus 900 updates these accumulated rotation amount and accumulated number of printed papers stored in the drum memory 100 each time printing process is performed. This update process may be performed by incrementing value from zero (0) or by decrementing value from a prescribed value.

An IC chip can be employed as the drum memory 100, for example. The drum memory 100 has electrical contact surfaces 101 having electrical conductivity. The electrical contact surfaces 101 are positioned closer to another side in the second direction of the drum frame 70 than the drum coupling 80 is to the other side in the second direction of the drum frame 70.

Specifically, the electrical contact surfaces 101 are positioned between the drum coupling 80 and the toner coupling 31 in a state where the toner cartridge 1 is attached to the drum frame 70. Further, in the state where the toner cartridge 1 is attached to the drum frame 70, the drum coupling 80, the electrical contact surfaces 101 of the drum memory 100, the toner coupling 31, and the electrical contact surface 51 of the toner memory 50 are arranged in this order in the second direction.

Even in the state where the toner cartridge 1 is attached to the drum frame 70, the electrical contact surfaces 101 are positioned at the outer surface of the drum frame 70 without being covered by the toner cartridge 1. As the drum holder 90 moves in the second direction relative to the drum frame 70, the electrical contact surfaces 101 of the drum memory 100 move together with the drum holder 90 in the second direction relative to the drum frame 70.

<4. Attachment of Drum Cartridge to Main Body Frame>

Next, operation performed in a case where the drum cartridge 2 to which the toner cartridge 1 is attached is attached to the main body frame 910 of the image forming apparatus 900 will be described.

Figure 6:
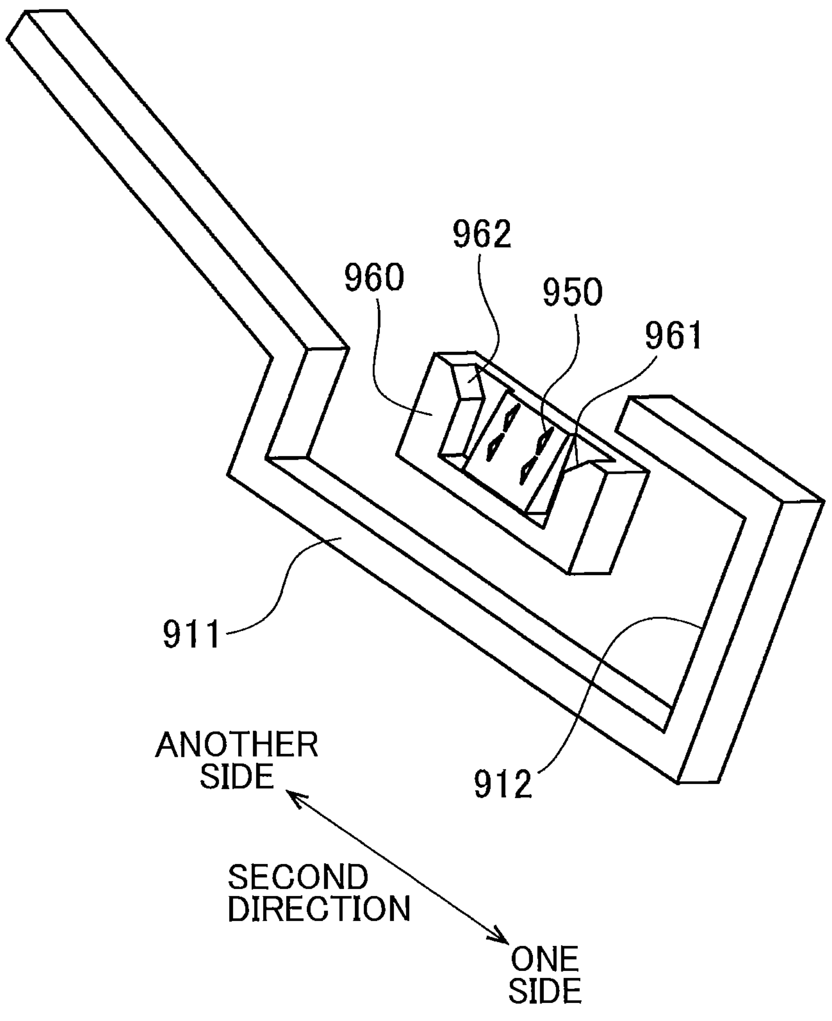
FIG. 6 is a perspective view of one of guide frames in a main body frame of the image forming apparatus according to the embodiment.

FIG. 6 is a perspective view of one of the guide frames 911 of the main body frame 910. As illustrated in FIG. 6, the guide frame 911 includes a collar holding portion 912 configured to hold the drum collar 74 of the corresponding drum cartridge 2. The collar holding portion 912 has a substantially U-shape opening toward the other side in the second direction. Further, the image forming apparatus 900 also includes a drum-electrical contact 950 having electrical conductivity, as illustrated in FIG. 6. The drum-electrical contact 950 is positioned further in the second direction toward the other side than the collar holding portion 912. The drum-electrical contact 950 is electrically connected to the controller 940. The drum-electrical contact 950 is an example of an electrical contact.

Further, as illustrated in FIG. 6, the main body frame 910 includes a contact holder 960 that holds the drum-electrical contact 950. The contact holder 960 is positioned further in the second direction toward the other side than the collar holding portion 912. The contact holder 960 has a first guide surface 961 and a second guide surface 962. The first guide surface 961 is positioned further in the second direction toward the one side than the drum-electrical contact 950. The second guide surface 962 is positioned further in the second direction toward the other side than the drum-electrical contact 950. A distance between the first guide surface 961 and the second guide surface 962 in the second direction is gradually reduced as extending in a pivotally moving direction (described later).

Figure 7:
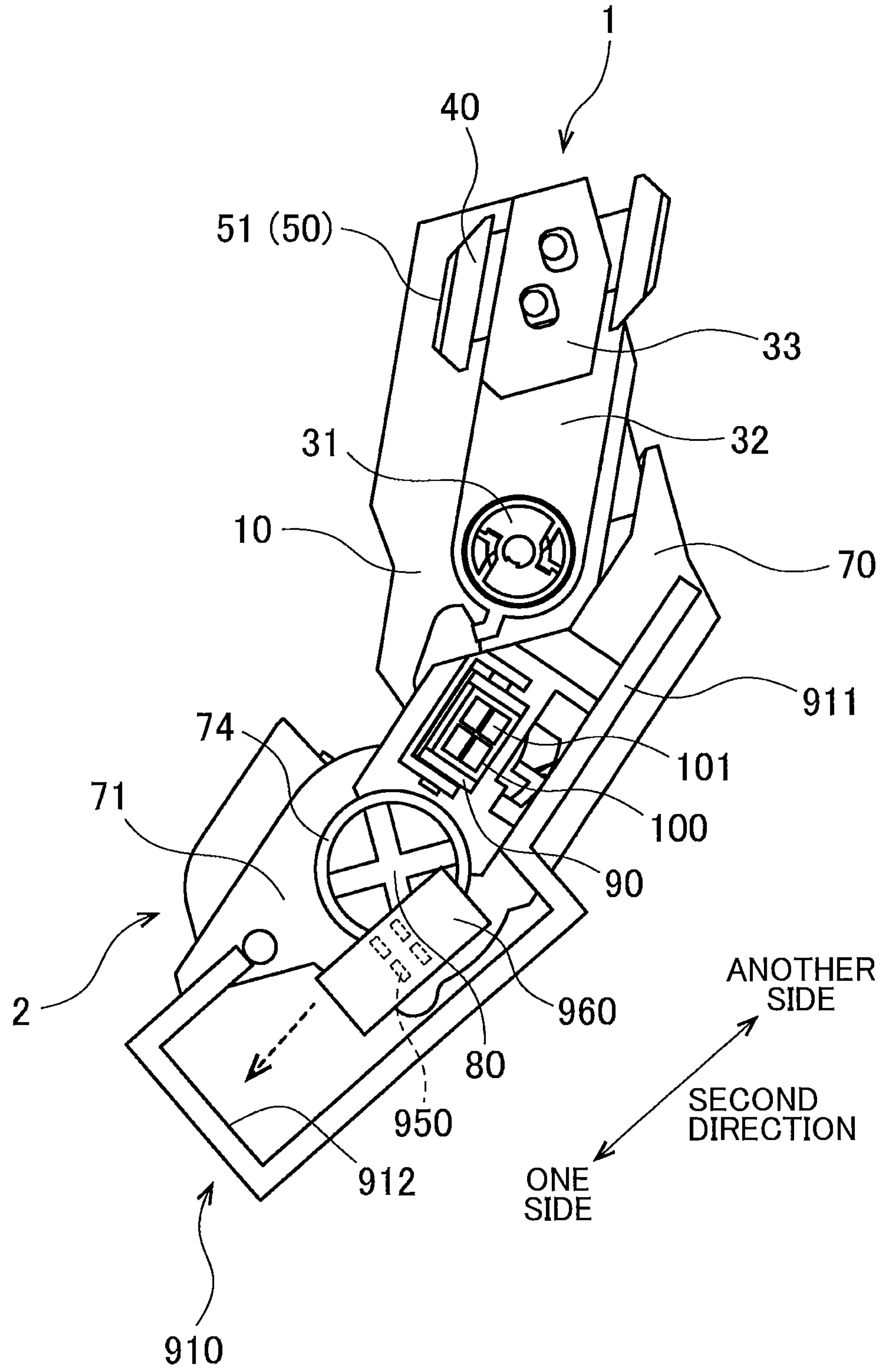
FIG. 7 is a view illustrating attachment process of the drum cartridge according to the embodiment to which the toner cartridge is attached to the main body frame of the image forming apparatus as viewed from the one side in the first direction.
Figure 8:
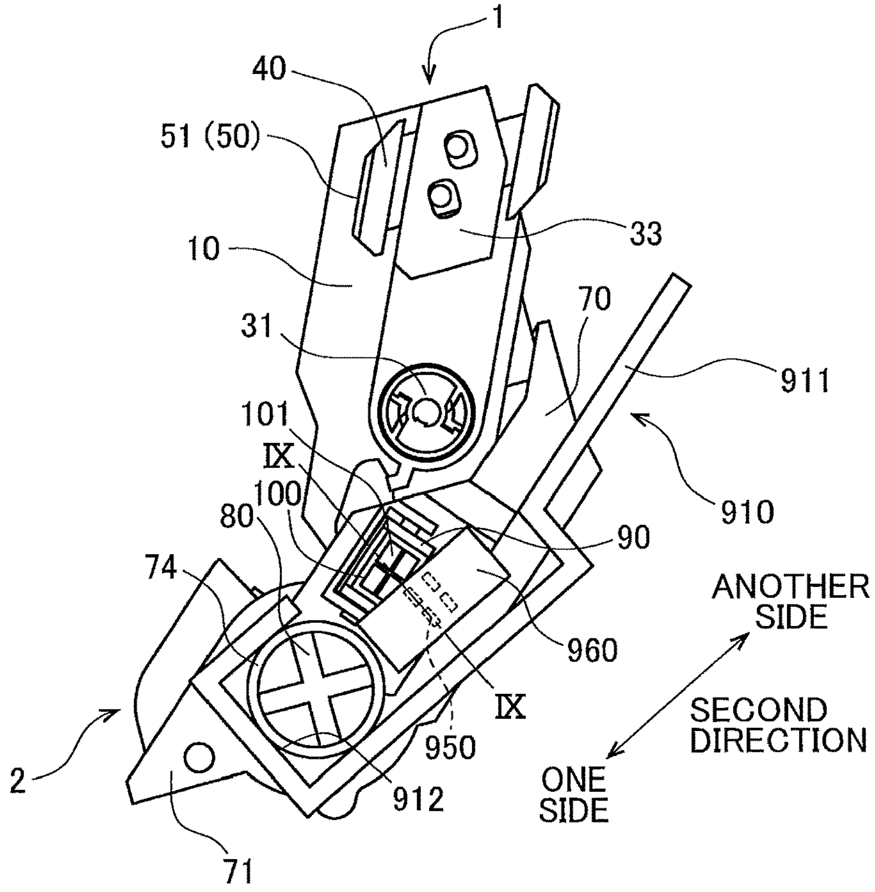
FIG. 8 is another view illustrating the attachment process of the drum cartridge according to the embodiment to which the toner cartridge is attached to the main body frame of the image forming apparatus as viewed from the one side in the first direction.
Figure 9:
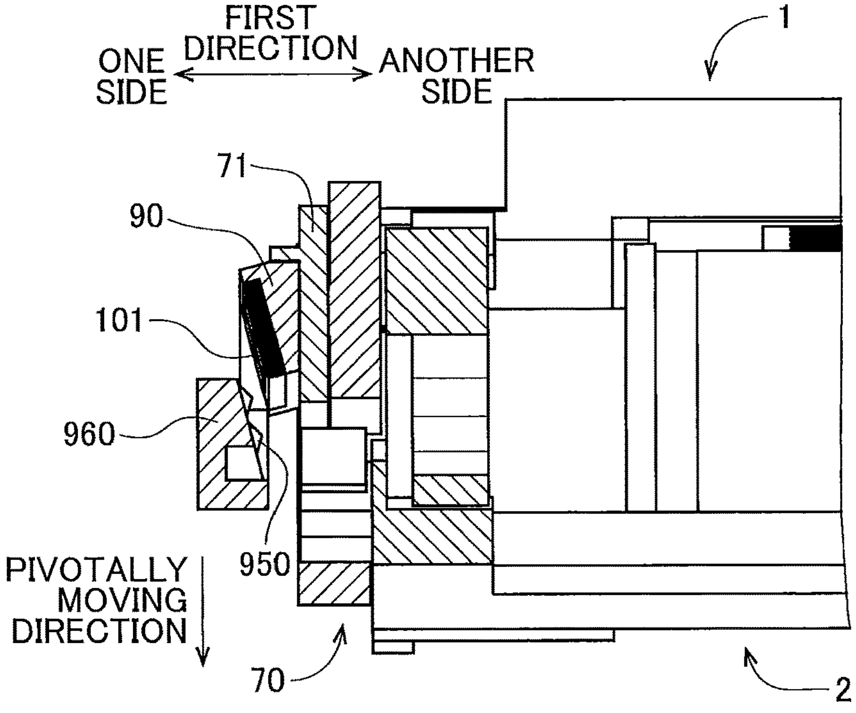
FIG. 9 is a cross-sectional view taken along a line IX-IX in FIG. 8.
Figure 10:
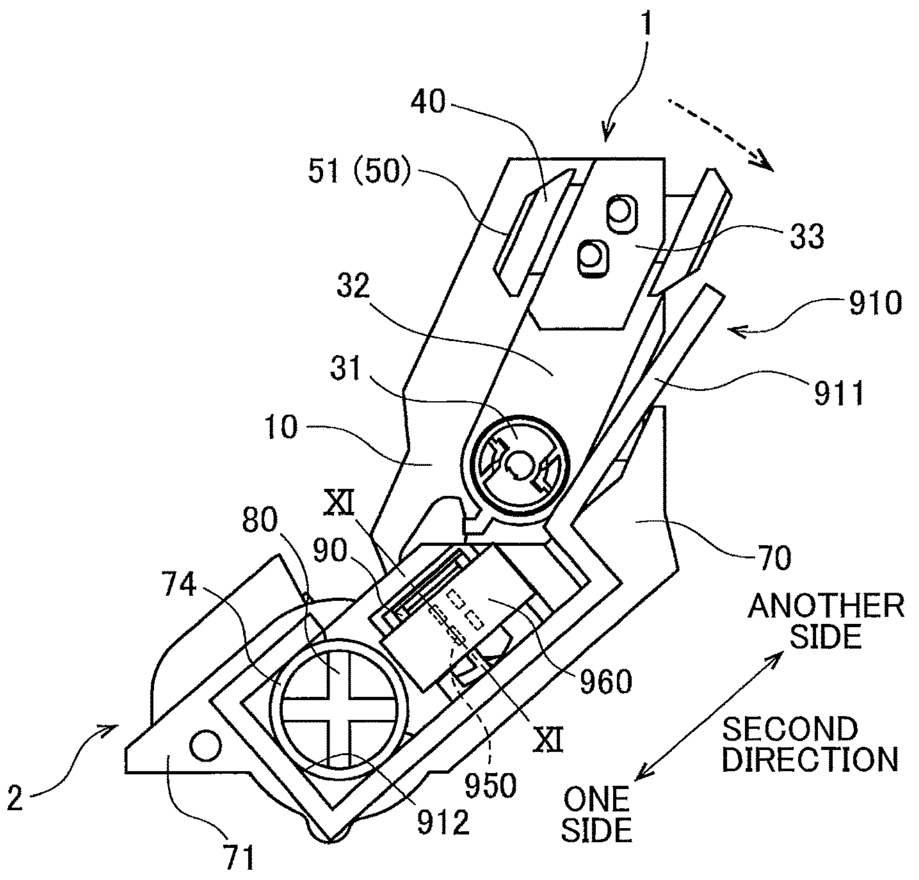
FIG. 10 is a still another view illustrating the attachment process of the drum cartridge according to the embodiment to which the toner cartridge is attached to the main body frame of the image forming apparatus as viewed from the one side in the first direction.
Figure 11:
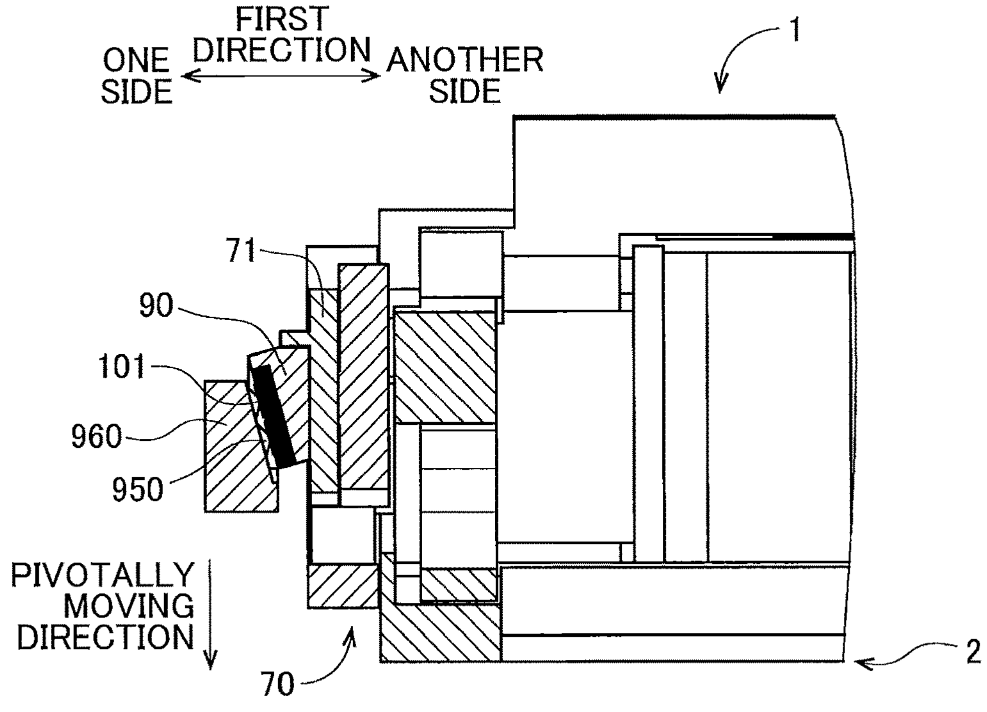
FIG. 11 is a cross-sectional view taken along a line XI-XI in FIG. 10.

FIGS. 7, 8 and 10 are views illustrating process of attachment of the drum cartridge 2 to which the toner cartridge 1 is attached to the main body frame 910 of the image forming apparatus 900 as viewed from the one side in the first direction. FIG. 9 is a cross-sectional view taken along a line IX-IX in FIG. 8. FIG. 11 is a cross-sectional view taken along a line XI-XI in FIG. 10.

In order to attach the drum cartridge 2 to which the toner cartridge 1 is attached to the main body frame 910, the drum cartridge 2 to which the toner cartridge 1 is attached moves toward the one side in the second direction relative to the main body frame 910 as indicated by a broken line arrow in FIG. 7. Accordingly, the drum collar 74 approaches the collar holding portion 912, and then is brought into contact with the generally U-shaped surface of the collar holding portion 912 as illustrated in FIG. 8. With this contact, the collar holding portion 912 holds the drum collar 74, thereby positioning the drum collar 74 relative to the main body frame 910.

Subsequently, the drum cartridge 2 pivotally moves in the pivotally moving direction as indicated by a broken line arrow in FIG. 10 about the drum collar 74 relative to the main body frame 910. As a result of this pivotal movement, the outer circumferential surface of the photosensitive drum 60 is brought into contact with the transfer belt 922. At the same time, the drum holder 90 is inserted into a portion between the first guide surface 961 and the second guide surface 962 of the contact holder 960, and moves in the second direction (i.e., a direction crossing the pivotally moving direction) relative to the drum frame 70 by the contact with one of the first guide surface 961 and the second guide surface 962. As a result, the drum holder 90 is positioned relative to the main body frame 910 in the second direction.

Upon completion of the pivotal movement of the drum cartridge 2 relative to the main body frame 910, the electrical contact surfaces 101 held by the drum holder 90 contacts the drum-electrical contact 950 held by the contact holder 960. Therefore, the drum memory 100 is electrically connected to the controller 940 through the electrical contact surfaces 101 and the drum-electrical contact 950. Accordingly, the controller 940 can perform at least one of reading data from the drum memory 100 and writing data into the drum memory 100.

Further, upon completion of the pivotal movement of the drum cartridge 2 relative to the main body frame 910, the electrical contact surface 51 of the toner memory 50 contacts the toner-electrical contact (not illustrated) of the image forming apparatus 900. Accordingly, the toner memory 50 is electrically connected to the controller 940 through the electrical contact surface 51 and the toner-electrical contact. By virtue of this electrical connection, the controller 940 can perform at least one of reading data from the toner memory 50 and writing data into the toner memory 50.

At a timing immediately after the drum cartridge 2 is attached to the main body frame 910, the lock lever 930 is at the release position as illustrated in FIG. 1. Further, the drum cartridge 2 receives a pressing force directed toward the other side in the second direction from the corresponding pressure roller 923 of the belt unit 920.

As the cover of the image forming apparatus 900 is closed, the lock lever 930 pivotally moves to press the drum frame 70 toward the one side in the second direction, thereby positioning the drum frame 70 relative to the main body frame 910. At this time, the drum frame 70 moves slightly toward the one side in the second direction relative to the main body frame 910 due to the pressing force of the lock lever 930. Here, the electrical contact surfaces 101 of the drum holder 90 are movable in the second direction relative to the drum frame 70. This configuration can move the drum frame 70 toward the one side in the second direction relative to the main body frame 910 while maintaining the contacting state between the electrical contact surfaces 101 and the drum-electrical contact 950.

As described above, both the electrical contact surfaces 101 of the drum memory 100 and the drum coupling 80 are positioned at the first side plate 71 of the drum frame 70. Further, the electrical contact surfaces 101 are positioned closer to the other side in the second direction of the drum frame 70 than the drum coupling 80 is to the other side in the second direction of the drum frame 70. Therefore, the electrical contact surfaces 101 can be positioned on the basis of the position of the drum coupling 80 in the state where the drum cartridge 2 is attached to the main body frame 910 of the image forming apparatus 900, whereby accurate positioning of the electrical contact surfaces 101 relative to the main body frame 910 can be attained.

Further, in the image forming apparatus 900 according to the embodiment, the drum frame 70 pivotally moves about the drum collar 74 relative to the main body frame 910 in a case where the drum cartridge 2 is attached to the main body frame 910, and this pivotally movement causes the electrical contact surfaces 101 to be positioned relative to the main body frame 910. That is, positioning of the electrical contact surfaces 101 relative to the main body frame 910 can be performed by making use of the attaching operation of the drum cartridge 2 to the main body frame 910.

Further, the drum holder 90 is movable in the second direction relative to the drum frame 70. With this configuration, even if the drum frame 70 moves in the second direction relative to the main body frame 910 after completing the attachment of the drum cartridge 2 to the main body frame 910, the position of the drum holder 90 in the second direction relative to the main body frame 910 can be retained unchanged. Hence, the contacting state between the electrical contact surfaces 101 and the drum-electrical contact 950 can be maintained.

Further, as illustrated in FIGS. 9 and 11, the electrical contact surfaces 101 are inclined relative to the first direction and the pivotally moving direction. Specifically, the electrical contact surfaces 101 are inclined so as to approach the first side plate 71 as extending toward the downstream side in the pivotally moving direction. Accordingly, the pivotal movement of the drum frame 70 about the drum collar 74 enables the electrical contact surfaces 101 to contact more reliably with the drum-electrical contact 950.

Further, the electrical contact surfaces 101 protrude further toward the one side in the first direction than the drum collar 74 does. That is, the electrical contact surfaces 101 are positioned farther from the one side surface in the first direction of the first side plate 71 than one end in the first direction of the drum collar 74 is from the one side surface. With this configuration, the drum-electrical contact 950 and the contact holder 960 do not prevent movement of the drum collar 74 during the process of the attachment of the drum cartridge 2 to the main body frame 910 (for example, in a state illustrated in FIG. 7). Accordingly, the drum collar 74 can move to the collar holding portion 912 without the movement thereof hindered by the drum-electrical contact 950 and the contact holder 960.

As illustrated in FIGS. 4 and 5, the drum memory 100 in the present embodiment includes the four electrical contact surfaces 101. The four electrical contact surfaces 101 are positioned on the one side surface in the first direction of the drum holder 90 and arranged in a lattice pattern. However, the number of the electrical contact surfaces 101 of the drum memory 100 may be one to three, or more than five. Further, the four electrical contact surfaces 101 may be arranged in line in the second direction.

It is preferable that each of the electrical contact surfaces 101 extends in the pivotally moving direction of the drum frame 70. With such a configuration, each of the electrical contact surfaces 101 can more securely contact the drum-electrical contact 950 of the image forming apparatus 900 by the pivotal movement of the drum frame 70 about the drum collar 74.

<5. Modifications>

While the description has been made in detail with reference to the embodiment, it would be apparent to the person skilled in the art that the present disclosure is not limited thereto and various changes and modifications may be made thereto. In the following description, differences between various modifications and the above-described embodiment will be mainly described.

<5-1. First Modification>

Figure 12:
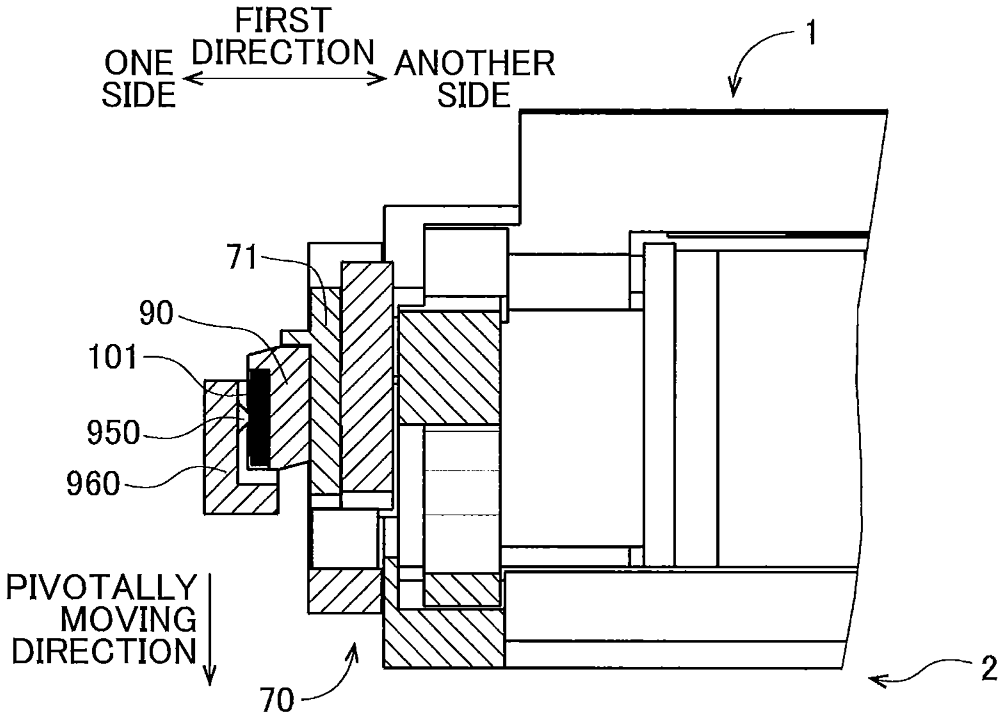
FIG. 12 is a cross-sectional view of a drum cartridge according to a first modification taken along a line corresponding the line XI-XI in FIG. 10.

A first modification to the embodiment will be described with reference to FIG. 12 wherein like parts and components are designated by the same reference numerals as those shown in the above-described embodiment. FIG. 12 is a cross-sectional view of a drum cartridge 2 according to the first modification taken along a cross-section the same as FIG. 11. In the first modification, electrical contact surfaces 101 of a drum memory 100 are not inclined relative to the first direction and the pivotally moving direction of the drum frame 70 about the drum collar 74. Specifically, the electrical contact surfaces 101 extend perpendicularly to the first direction. Further, a drum-electrical contact 950 of an image forming apparatus 900 can be displaced in the first direction.

Even with the above configuration, an error in position of the drum frame 70 can be absorbed by the displacement of the drum-electrical contact 950, whereby the electrical contact surfaces 101 are enabled to contact the drum-electrical contact 950. In this case, it is preferable that the drum-electrical contact 950 is urged toward the other side in the first direction by an urging member (illustration is omitted).

<5-2. Other Modifications>

In the above-described embodiment, the toner memory 50 having the electrical contact surface 51 is fixed to the outer surface of the toner holder 40. However, only the electrical contact surface 51 may be fixed to the outer surface of the toner holder 40, and a portion of the toner memory 50 other than the electrical contact surface 51 may be positioned at another portion of the toner cartridge 1.

Further, in the above-described embodiment, the drum memory 100 having the electrical contact surfaces 101 is fixed to the outer surface of the drum holder 90. However, only the electrical contact surfaces 101 may be fixed to the outer surface of the drum holder 90, and a portion of the drum memory 100 other than the electrical contact surfaces 101 may be positioned at another portion of the drum cartridge 2.

Further, detailed shapes of the toner cartridge 1, the drum cartridge 2 and the image forming apparatus 900 may be different from those illustrated in the drawings. Further, parts and components appearing in the above-described embodiment and the modifications may be suitably combined together as long as any conflicting configuration is avoided.

What is claimed is:

1. A drum cartridge comprising:

a photosensitive drum rotatable about an axis extending in a first direction;

a drum frame having one end portion in a second direction at which the photosensitive drum is positioned;

a drum coupling rotatable together with the photosensitive drum; and an electrical contact surface positioned closer to another side in the second direction of the drum frame than the drum coupling is to the another side in the second direction of the drum frame.

2. The drum cartridge according to claim 1, further comprising a drum memory including the electrical contact surface, the drum memory storing information regarding the drum cartridge.

3. The drum cartridge according to claim 1, wherein the drum cartridge is attachable to a main body frame of an image forming apparatus, wherein the drum frame includes a drum collar extending in the first direction at a peripheral portion of the drum coupling, and wherein, in a case where the drum cartridge is attached to the main body frame, the drum frame pivotally moves about the drum collar.

4. The drum cartridge according to claim 3, wherein, when the drum cartridge is attached to the main body frame, the drum collar is positioned relative to the main body frame.

5. The drum cartridge according to claim 3, wherein the electrical contact surface extends along a pivotally moving direction in which the drum frame pivotally moves about the drum collar.

6. The drum cartridge according to claim 5, wherein the electrical contact surface is inclined relative to the first direction and the pivotally moving direction.

7. The drum cartridge according to claim 5, further comprising a holder holding the electrical contact surface, the holder being movable in a direction crossing the pivotally moving direction relative to the drum frame.

8. The drum cartridge according to claim 7, wherein the holder is movable in the second direction relative to the drum frame.

9. The drum cartridge according to claim 8, wherein the drum frame has:
- a first restricting surface facing one end surface in the second direction of the holder in the second direction; and
- a second restricting surface facing another end surface in the second direction of the holder in the second direction, and
- wherein a distance between the first restricting surface and the second restricting surface in the second direction is greater than a length between the one end surface and the another end surface of the holder in the second direction.

10. The drum cartridge according to claim 3, wherein the electrical contact surface is positioned farther from an outer surface of the drum frame than one end portion in the first direction of the drum collar is from the outer surface in the first direction.

11. The drum cartridge according to claim 1, wherein the drum frame is configured to receive a toner cartridge.

12. The drum cartridge according to claim 11, wherein, in a state where the toner cartridge is attached to the drum frame, the electrical contact surface is positioned at an outer surface of the drum frame.

13. The drum cartridge according to claim 11, wherein the toner cartridge includes:
- a developing roller rotatable about an axis extending in the first direction; and
- a toner coupling rotatable together with the developing roller, and
- wherein, in a state where the toner cartridge is attached to the drum frame, the electrical contact surface is positioned between the drum coupling and the toner coupling.

14. The drum cartridge according to claim 13, wherein the toner cartridge further includes a toner memory having an electrical contact surface, and
- wherein, in the state where the toner cartridge is attached to the drum frame, the drum coupling, the electrical contact surface of the drum cartridge, the toner coupling, and the electrical contact surface of the toner cartridge are arranged in the second direction.

15. The drum cartridge according to claim 1, wherein the electrical contact surface is positioned at an outer surface of the drum frame.

16. An image forming apparatus to which the drum cartridge according to claim 1 is attachable, the image forming apparatus comprising:
- a main body frame to which the drum cartridge is attachable; and
- an electrical contact in contact with the electrical contact surface in a state where the drum cartridge is attached to the main body frame.

17. The image forming apparatus according to claim 16, further comprising a belt unit configured to press the drum frame toward the another side in the second direction in the state where the drum cartridge is attached to the main body frame.

* * * * *